Figure 1:
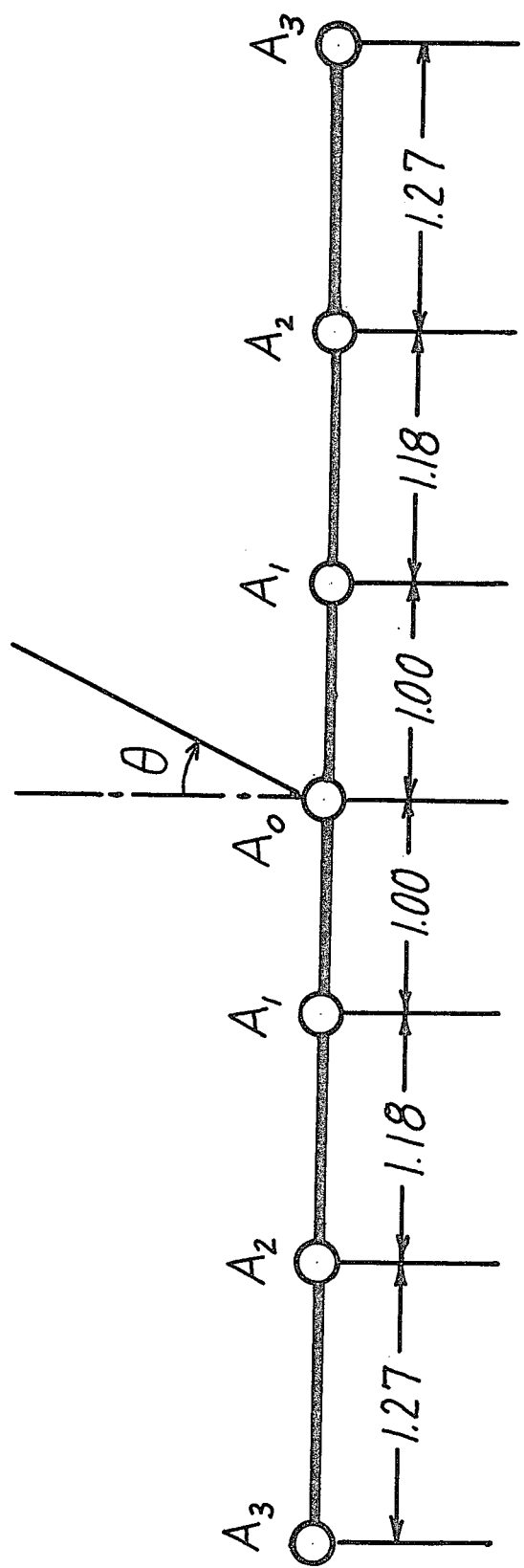

United States Patent [19]

Unz

[11] 4,104,641
[45] Aug. 1, 1978

[54] NONUNIFORMLY OPTIMALLY SPACED ARRAY WITH SPECIFIED SIDELOBE POSITIONS IN THE RADIATION PATTERN

[76] Inventor: Hillel Unz, c/o EE Dept. Kansas Univ., Lawrence, Kans. 66045

[21] Appl. No.: 764,410

[22] Filed: Jan. 31, 1977

[51] Int. Cl.² .......................................... H01Q 21/08
[52] U.S. Cl. .................................. 343/844; 343/719; 340/6 R; 340/9
[58] Field of Search ...................... 343/719, 844, 853; 340/6 R, 9

[56] References Cited

U.S. PATENT DOCUMENTS 3,877,033    4/1975    Unz ...................................... 343/844

Primary Examiner—Eli Lieberman

[57] ABSTRACT

The object of this invention is to provide a method for a new nonuniformly spaced array with nonuniform amplitudes for sonar, seismic, and electromagnetic applications, where the optimum positions and the optimum amplitudes of the array elements along its axis are systematically determined in order to produce a radiation pattern with specified sidelobe positions (directions) in the radiation pattern. By specifying the sidelobe positions (directions) in the radiation pattern one controls the beamwidth and the sidelobe level value of a directive pattern, and certain other characteristics of other radiation patterns. This method is based on the present invention by which the radiation pattern of a symmetric nonuniformly spaced array with nonuniform amplitudes is expressed rigorously by a constant plus a determinant, where the specified sidelobe positions (directions) of the radiation pattern are introduced explicitly into the determinant in a simple form. Additional number of sidelobe positions (directions) in the radiation pattern may be found implicitly by solving a determinantal equation. The values of the sidelobe levels in the radiation pattern may be specified in relation to each other, and/or in relation to the value of the main beam level, and these relationships will be expressed by determinantal equations, to be solved directly, or through the application of related transcendental trigonometric equations or sets of equations, in order to obtain the optimum positions of the array elements along the axis of the array. This new invention applies in general to symmetric nonuniformly spaced arrays with nonuniform amplitudes and with either even or odd number of elements, where (N−1) sidelobe positions (directions) could be specified explicitly and independently in a simple form for a symmetric array with (2N) or (2N+1) elements. This new array will be designated the Nonuniformly Optimally Spaced Array with Specified Sidelobe Positions, or in short, the NOSA-SSLP array.

10 Claims, 1 Drawing Figure

NONUNIFORMLY OPTIMALLY SPACED ARRAY WITH SPECIFIED SIDELOBE POSITIONS IN THE RADIATION PATTERN

The general idea of the nonuniformly spaced antenna arrays was invented by Unz in 1955, and was publicly proposed and published for the first time in his University of California (Berkeley, 1956) doctoral dissertation, where the first significant work on the subject was reported. From 1960 on, many additional contributions have been made on nonuniformly spaced arrays by numerous authors, and references to most of them may be found in recent books on antennas. However, the main synthesis problem of the nonuniformly spaced arrays, namely, finding the most optimum position of the elements of the array in order to produce a given specified radiation pattern, has not been solved rigorously to date. This is primarily due to the great difficulties in the solution of this highly non-linear problem. The trial and error computer techniques and the other pseudo-optimum synthesis methods suggested so far are of very limited utility, and are almost impossible to employ with arrays of a large number of elements. Thus, the nonuniformly spaced arrays cannot be technically designed at the present time to their full potential advantage, if at all, and therefore are not generally used. Nonuniformly spaced arrays could be also used for the purpose of elimination and reduction of grating lobes. Even in this case very little and limited work has been done so far.

The first object of this invention is to provide a method by which the radiation pattern with specified sidelobe positions of a nonuniformly spaced array with nonuniform amplitudes can be expressed rigorously as a determinant, where the specified sidelobe positions of the radiation pattern are introduced explicitly in the above determinant in a simple form. This new invention, where the radiation pattern is expressed in the form of a determinant, which displays explicitly the sidelobe positions of the array radiation pattern, allows us to calculate the radiation pattern of a large nonuniformly spaced array with nonuniform amplitudes by using standard computer procedures of developing large determinants. By using this new invention of expressing the radiation pattern in the form of a determinant, the new Nonuniformly Optimally Spaced Array with Specified Sidelobe Positions (the NOSA-SSLP array) could be designed to give a radiation pattern with specified sidelobe positions in desired specific directions. in the visible and/or the invisible region. By doing so one is able to control the radiation pattern within the visible range; one is able, for example, to lower the sidelobe level and/or to narrow the beamwidth of a directive radiation pattern, or otherwise control the radiation pattern in accordance with other specifications. Thus, this method of expressing the radiation pattern with specified sidelobe positions of a nonuniformly spaced array with nonuniform amplitudes in the form of a determinant, where the sidelobe positions of the radiation pattern are displayed explicitly in a simple form, is an essential part of this invention.

The second object of this invention is to provide a nonuniformly spaced array with nonuniform amplitudes, where the array elements are distributed in optimum positions along the axis of the array, when the level of the sidelobes specified in the radiation pattern of the array are given in a certain manner. In a symmetric array with an odd number of elements one could require, for example, that the level of two specified positive sidelobes, or two specified negative sidelobes, will be identical of the same height in the radiation pattern. Alternatively, one could specify that the levels of all the positive specified sidelobes and all the negative specified sidelobes will be identical of the same height in the radiation pattern. In a symmetric array with an even number of elements one could require, for example, that the level of two specified sidelobes, one positive and one negative, will be of identical magnitude of the same height in the power radiation pattern. Alternatively, one could specify that the levels of all the positive and the negative specified sidelobes will be of identical magnitudes of the same height in the power radiation pattern. The above specifications apply only to the specified sidelobes which are introduced explicitly in the determinantal form expression of the radiation pattern. In each one of the above examples of specification of the levels of the explicitly specified sidelobes, as well as in many other similar examples, a transcendental trigonometric equation could be found, the solution of which will give the corresponding array elements positions along the axis of the nonuniformly spaced array. The nonuniform amplitudes of the elements will be found from the corresponding determinantal expression of the radiation pattern. Since the transcendental trigonometric equations include arbitrary real positive or negative constants, the resulting array elements distribution along the axis of the array is not unique, and one should choose among them the best possible distribution of the elements along the axis of the array from their corresponding resulting radiation patterns.

The optimal distribution of the elements along the axis of the array is determined so that the NOSA-SSLP array of this invention will give the best performance in its radiation pattern with the specified and prescribed sidelobe positions in the radiation pattern. In a directive array a better performance in its radiation pattern means a more optimal performance of its characteristics, such as lower sidelobe level, and/or narrower beamwidth, and/or higher gain, etc. This invention is by no means limited to the particular techniques described above for finding the array elements distribution along the axis of the array by solving the transcendental trigonometric equations, and it could be extended to other techniques for finding the optimum element distribution, which are based on the above mentioned expression of the NOSA-SSLP array in the form of a determinant expression for the radiation pattern, where the sidelobe positions of the radiation pattern are given explicitly in a simple form. Furthermore, since the NOSA-SSLP array is the building block for any number of other more sophisticated arrays, this invention covers all other arrays, where they include in whole or in part the NOSA-SSLP array, including, but not limited to the following: Symmetric and nonsymmetric arrays, linear, two and three dimensional arrays, arrays of arrays, scanning arrays and phased arrays, broadband arrays and frequency independent arrays, omni-directional arrays, broadside arrays, endfire arrays, monopulse arrays, and many others.

The invention is illustrated by the accompanying drawing in which:

FIG. 1 represents the Nonuniformly Optimally Spaced Array with Specified Sidelobe Positions in the radiation pattern (the NOSA-SSLP array) with seven elements in a symmetric configuration.

All lengths in the array are in terms of half wavelengths ($\lambda/2$). Thus the array has a total length of $3.45\lambda$, where $\lambda$ is the wavelength; the corresponding distances of the array elements from the center element are $d_1 = 1.00$ ($\lambda/2$), $d_2 = 2.18$ ($\lambda/2$) and $d_3 = 3.45$ ($\lambda/2$). The sidelobe positions of the radiation pattern of the array in FIG. 1 have been specified a priori at $v_1 = 90°$ and at $v_2 = 180°$. The positions of the elements above have been specified a priori as given above. As a result of the present invention one finds the amplitudes of the elements in FIG. 1 for the above specified sidelobe positions in the radiation pattern to be: $A_o = 0.667$, $A_1 = 0.683$, $A_2 = 0.453$, $A_3 = 0.142$. The details of finding the above amplitudes of the seven array element NOSA-SSLP array in FIG. 1 will be described later on. The radiation pattern of the NOSA-SSLP array in FIG. 1 is a directive radiation pattern with sidelobe level below the maximum of 44.8 db and the beamwidth between nulls of 55.8°.

The radiation pattern $F(\theta)$ of a general linear symmetric nonuniformly spaced array with nonuniform amplitudes is given by:

$$F(\theta) = \sum_{p=1}^{N} A_p \cos(kd_p \sin \theta) + \frac{A_o}{2} \qquad (1)$$

where $k = 2\pi/\lambda$, $\lambda$ being the wavelength, $\theta$ is the angle with the normal to the array axis ($-\pi/2 < \theta \leq +\pi/2$), $d_p$ is the distance of the p-th element of the array with amplitude $A_p$ from the center of the array. The sum in eq. (1) is only over one half of the symmetric nonuniformly spaced array, where the center element is excluded. Since the radiation pattern $F(\theta)$ is usually normalized, the factor 2 has been excluded. In case of a symmetric nonuniformly spaced array with odd number of elements the total number of elements in the array will be ($2N+1$) where $A_o/2$ represents the contribution of the center element of amplitude $A_o$ at the center of the array where $d_o = 0$. In case of a symmetric nonuniformly spaced array with even number of elements the total number of elements in the array will be $2N$; in this case there will not be a center element and the term $A_o/2$ in eq. (1) should be cancelled, or taken to be zero. Equation (1) may be rewritten in the form:

$$F(u) = \sum_{p=1}^{W} A_p \cos(x_p u) + \frac{A_o}{2} \qquad (2)$$

where $u = \pi \sin \theta = 180° \sin \theta$ ($-\pi < u \leq +\pi$) and $x_p = d_p/(\lambda/2)$ gives the distance of the p-th array element from the center of the array in terms of half wavelength.

The present invention may be described by the following general principles:

A. The radiation pattern in eq. (2) of a general symmetric nonuniformly spaced array with even number of elements $2N$ is represented by a determinant of N rows and N columns, with the first row consisting of the N terms $(\cos x_p u) / x_p$ where $p$ takes the values 1 to N.

B. One is able to specify explicitly a priori (N-1) positions of sidelobes in the radiation pattern in eq. (2) of the general symmetric nonuniformly spaced array with even number of elements $2N$.

C. For each sidelobe position $u = v_s$ of the radiation pattern thus specified, one also has to specify explicitly one row of the above mentioned determinant (except the first row), with the N elements of the row being in the form ($\sin x_p v_s$), where $v_s$ is the same in all the N elements of the row and $p$ takes the values 1 to N. The whole determinant will be thus specified by specifying explicitly (N-1) positions of sidelobes $u = v_1$, $u = v_2$, $u = v_3$, ... $u = v_{N-1}$ in the radiation pattern of the general symmetric nonuniformly spaced array with even number of elements $2N$.

D. For the case of a general symmetric nonuniformly spaced array with odd number of elements ($2N+1$), the radiation pattern is represented by the same determinant of N rows and N columns as above, with the addition of a constant $F_o = A_o/2$ outside the determinant, which will represent the contribution of the additional center element to the radiation pattern.

E. One obtains the amplitudes $A_p$ of all the elements of the general symmetric nonuniformly spaced array by developing the above determinant along its first row and comparing the final result with eq. (2) above.

The radiation pattern $F(u)$ of the general symmetric nonuniformly spaced array with even number of elements $2N$, in which (N-1) positions of the sidelobes in the radiation pattern $u = v_1$, $u = v_2$, $u = v_3$, ... $u = v_{N-1}$ have been explicitly specified a priori, is given in the form of a determinant in accordance with the above general principles as follows:

$$F(u) = \begin{vmatrix} \frac{\cos(x_1 u)}{x_1} & \frac{\cos(x_2 u)}{x_2} & \frac{\cos(x_3 u)}{x_3} & \cdots & \frac{\cos(x_N u)}{x_N} \\ \sin(x_1 v_1) & \sin(x_2 v_1) & \sin(x_3 v_1) & \cdots & \sin(x_N v_1) \\ \sin(x_1 v_2) & \sin(x_2 v_2) & \sin(x_3 v_2) & \cdots & \sin(x_N v_2) \\ \sin(x_1 v_3) & \sin(x_2 v_3) & \sin(x_3 v_3) & \cdots & \sin(x_N v_3) \\ \cdots & \cdots & \cdots & \cdots & \cdots \\ \sin(x_1 v_{N-1}) & \sin(x_2 v_{N-1}) & \sin(x_3 v_{N-1}) & \cdots & \sin(x_N v_{N-1}) \end{vmatrix} \qquad (3a)$$

The corresponding radiation pattern $F(u)$ for the general symmetric nonuniformly spaced array with odd number of elements ($2N+1$) is given in the following form:

$$F(u) = |\text{DETERMINANT}| + F_o = |\text{DETERMINANT}| + A_o/2 \qquad (3b)$$

where $|\text{DETERMINANT}|$ represents the determinant given in eq. (3a) and $F_o = A_o/2$ represents the contribution of the additional center element of amplitude $A_o$ to the radiation pattern.

From the general theory of determinants it is well known that by developing the determinant in eq. (3) along its first row one will obtain an expression equivalent to the radiation pattern given in eq.(2). Furthermore, from the general theory of determinants it is well known that by taking the derivative $F'(u)$ of the determinant in eq.(3) the first row of the determinant will be replaced by the terms $|-\sin(x_1 u), -\sin(x_2 u), -\sin(x_3 u), \ldots -\sin(x_N u)|$ 1st row while the rest of the terms in the determinant will remain the same. The constant terms $F_o = A_o/2$ in eq.(3b) will become zero. It is also well known that by choosing in the first row of the resulting determinant of $F'(u)$ the value $u = v_1$ in all the terms, the determinant will become zero, since the terms in the first two rows of the resulting determinant will become identical, with the exception of the minus sign. Thus one obtains from eq.(3) $F'(v_1) = 0$. Similarly, by choosing in the first row of the resulting determinant of $F'(u)$ the value $u = v_2$ in all the terms, the determinant will become zero, since the terms in the first row and the third row of the resulting determinant will become identical, with the exception of the minus sign. Thus one obtains from eq. (3) $F'(v_2) = 0$. Similarly one will obtain from eq. (3) $F'(v_3) = 0 \ldots F'(v_{N-1}) = 0$. Thus the positions $u = v_1$, $u = v_2$, $u = v_3$ etc. or $u = v_{N-1}$ will become the minimax points of the radiation pattern $F(u)$ as given by eq. (3) and therefore the specified sidelobe positions in the radiation pattern given in an explicit form in the determinantal equation (3). By developing the determinant in eq. (3) along its first row, it can be compared with the radiation pattern in eq. (2), and the amplitudes $A_p$ of the elements can thus be determined. It should also be mentioned that from eq. (3) one also obtains $F'(u=0) = 0$, where $u=0$ is the position of the main beam of the directive radiation pattern.

In the example given in FIG. 1, a seven element symmetric nonuniformly spaced array with nonuniform amplitudes is considered, where the elements' positions are taken to be at $x_o = 0$, $x_1 = 1.00$, $x_2 = 2.18$ and $x_3 = 3.45$. The explicit sidelobe positions of the radiation pattern $F(u)$ are specified and prescribed a priori at $v_1 = 90°$ and at $v_2 = 180°$. As a result, the corresponding terms of the determinantal expression of the radiation pattern $F(u)$ in eq. (3) may be found from the following: $x_1v_1 = 90°$; $x_2v_1 = 196.2°$; $x_3v_1 = 310.5°$; $x_1v_2 = 180°$; $x_2v_2 = 392.4°$; $x_3v_2 = 621°$.

The determinantal expression (3) of the radiation pattern $F(u)$ may be written in the following form for the present cases:

$$F(u) = \begin{vmatrix} \dfrac{\cos(x_1u)}{x_1} & \dfrac{\cos(x_2u)}{x_2} & \dfrac{\cos(x_3u)}{x_3} \\ \sin(x_1v_1) & \sin(x_2v_1) & \sin(x_3v_1) \\ \sin(x_1v_2) & \sin(x_2v_2) & \sin(x_3v_2) \end{vmatrix} + F_o \quad (4a)$$

Substituting the numerical values for the present case in eq. (4a) one obtains:

$$F(u) = \begin{vmatrix} \dfrac{\cos(x_1u)}{x_1} & \dfrac{\cos(x_2u)}{x_2} & \dfrac{\cos(x_3u)}{x_3} \\ \sin 90° & \sin 196.2° & \sin 310.5° \\ \sin 180° & \sin 392.4° & \sin 621° \end{vmatrix} + F_o \quad (4b)$$

$$F(u) = \begin{vmatrix} \dfrac{\cos(x_1u)}{1.00} & \dfrac{\cos(x_2u)}{2.18} & \dfrac{\cos(x_3u)}{3.45} \\ +1.0000 & -0.2790 & -0.7604 \\ 0 & +0.5358 & -0.9877 \end{vmatrix} + F_o \quad (4c)$$

and by developing the determinant in eq. (4c) along the first row one obtains:

$$F(u) = 0.683 \cos(x_1u) + 0.453 \cos(x_2u) + 0.155 \cos(x_3u) + F_o \quad (4d)$$

In the radiation pattern in eq. (4d) one finds the explicitly specified sidelobes at $u = v_1 = 90°$ and at $u = v_2 = 180°$ provided that $F_o$ is so chosen that the negative sidelobe value will be equal to the positive sidelobe value.

Using perturbations, one may obtain all the sidelobes to be of equal magnitude by slightly adjusting the factor of the term $\cos(x_3u)$ in eq. (4d), and by choosing the correct factor for $F_o$ as follows:

$$F(u) = 0.683 \cos(x_1u) + 0.453 \cos(x_2u) + 0.142 \cos(x_3u) + 0.3335 \quad (5a)$$

One finds in this case a directive radiation pattern of sidelobe level of 44.8 db below the level of the main beam at $u=0$ and beamwidth between nulls of 55.8°.

From the result in eq. (5a) one obtains the corresponding amplitudes of the seven element symmetric nonuniformly spaced array given in FIG. 1 as follows:

$$A_o = 2F_o = 0.667, A_1 = 0.683, A_2 = 0.453, A_3 = 0.142 \quad (5b)$$

The amplitude of the element in the center of the array $x_o=0$ is doubled, since in the symmetric array it can be looked upon as if one has two distinct elements at both sides of the origin $x_o=0$, both of them very close to it, so that they become superimposed on each other into the single center element.

By using the above determinantal expressions for the radiation pattern one is able to design a nonuniformly optimally spaced array with nonuniform amplitudes with specified and prescribed sidelobes in specific directions in the corresponding radiation pattern. By specifying the sidelobe positions of the radiation pattern beforehand, one is able to control the half-power beamwidth, the between nulls beamwidth, and/or the sidelobe level, and/or the scanning range, and/or other specific characteristics of the radiation pattern of the nonuniformly spaced array with nonuniform amplitudes. One is able to control the radiation pattern characteristics by concentrating the sidelobe positions of the radiation pattern in the visible range, or spreading them equally in the visible range, and/or spreading the sidelobes positions equally or unequally in the visible and/or the non-visible range. Essentially by specifying the directions of the sidelobe positions in the radiation pattern for the nonuniformly spaced array by using the present invention and its corresponding determinantal expressions for the radiation pattern, one controls the behavior of the radiation pattern. By using the determinantal expressions for the radiation pattern of the present invention the nonuniformly spaced array could be designed to give sidelobes in the corresponding radiation pattern in desired specific directions in the visible and the non-visible regions. By controlling the distribution of the sidelobe positions of the radiation pattern in specific directions, one is able to control the other parameters and characteristics of the radiation pattern of the nonuniformly spaced array with nonuniform amplitudes, for example, its sidelobe level, its beamwidth, its gain, etc.

When the level of the explicity given sidelobes in the present invention of the NOSA-SSLP array are specified as well in a certain manner, one obtains transcendental trigonometric equations with arbitrary real constants, the solution of which will give the positions of the corresponding array elements along the axis of the nonuniformly spaced array of the present invention. Some examples are listed below, but other examples not listed below are also possible within the general framework of the present invention of the NOSA-SSLP array as given in eq. (3) of the determinantal expression of the present invention. The first example will apply to any two explicitly specified sidelobes at the positions $u = v_i$ and $u = v_j$ of the radiation pattern $F(u)$ for symmetric NOSA-SSLP array for odd ($F_o \neq 0$) or even ($F_o = 0$) number of elements, provided that the two sidelobes are both positive or both negative (i.e. both are maximum or both are minimum) with respect to the zero level of the radiation pattern $F(u)$ as given in eq. (3). Taking the above mentioned two sidelobes to be of equal value one has:

$$F(v_i) = F(v_j) \text{ or } F(v_i) - F(v_j) = 0 \tag{6a}$$

Substituting eq. (3a) for symmetric array with even number of elements ($F_o=0$) in the right hand side equation of (6a), and combining the two determinants along the first row, one will obtain the resulting determinant to be zero. The same identical result will be obtained by similarly substituting eq. (3b) for symmetric array with odd number of elements ($F_o \neq 0$), since the constants $F_o$ in the two determinants will cancel each other. Each term in the first row of the resulting determinant will be the difference between the two corresponding terms of the two original determinants. From the general theory of determinants it is well known that the resulting determinant derived above will be zero if one has for every $k = 1,2,3 \ldots N$ the following identity:

$$\frac{\cos(x_k v_i)}{x_k} - \frac{\cos(x_k v_j)}{x_k} = \sum_{n=1}^{N-1} G_n \sin(x_k v_n) \tag{6b}$$

where $G_n$ are arbitrary real constants positive or negative. Equation (6b) gives us a set of transcendental trigonometric equations for equal value sidelobe levels for the NOSA-SSLP array which could be solved by non-linear computer techniques.

Let us take in eq. (6b) the particular case for the constants $G_n$ such that $G_i = B - C$ and $G_j = B + C$ and all other $G_n = 0$, where $b$ and $c$ are arbitrary real constants, positive or negative. In this particular case eq. (6b) will become:

$$\frac{\cos(x_k v_i)}{x_k} - \frac{\cos(x_k v_j)}{x_k} = (B - C)\sin(x_k v_i) + (B + C)\sin(x_k v_j) \tag{7a}$$

From eq. (7a) one obtains:

$$\frac{1}{x_k}[\cos(x_k v_i) - \cos(x_k v_j)] = B[\sin(x_k v_j) + \sin(x_k v_i)] + C[\sin(x_k v_j) - \sin(x_k v_i)] \tag{7b}$$

Using well known trigonometric identities in eq. (7b) one obtains:

$$\frac{2}{x_k} \sin\left[\frac{x_k(v_j - v_i)}{2}\right] \sin\left[\frac{x_k(v_j + v_i)}{2}\right] = \tag{7c}$$

$$2B\cos\left[\frac{x_k(v_j - v_i)}{2}\right] \sin\left[\frac{x_k(v_j + v_i)}{2}\right] + 2C\sin\left[\frac{x_k(v_j - v_i)}{2}\right] \cos\left[\frac{x_k(v_j + v_i)}{2}\right]$$

By dividing both sides of eq. (7c) one obtains:

$$1/x_k = B \operatorname{ctg}[x_k(v_j - v_i)/2] + C \operatorname{ctg}[x_k(v_j + v_i)/2] \tag{7d}$$

where $B$ and $C$ in eq. (7d) are arbitrary real constants positive or negative. When the arbitrary constants $b$ and $c$ are given and the positions of the equal sidelobe level $u = v_i$ and $u = v_j$ are specified, eq. (7d) becomes a transcendental trigonometric equation for finding the positions of the $x_k$ of the elements of the NOSA-SSLP array.

Taking in eq. (7d) the constant $C = 0$ and the constant $B \neq 0$ one obtains:

$$\tan[x_k(v_j - v_i)/2] = Bx_k \tag{8a}$$

where $B$ is arbitrary real constant positive or negative. Taking the negative lower (minimum) specified sidelobe positions to be explicitly at $u = v_1, v_3, v_5, v_7$, etc. and taking the positive upper (maximum) specified sidelobes positions to be explicitly at $u = v_2, v_4, v_6, v_8$, etc. let us choose the explicit positions of the sidelobes on each side to be at equal distances as follows:

$$2w = v_3 - v_1 = v_5 - v_3 = v_7 - v_5 = \text{etc.} \tag{8b}$$

$$2w = v_4 - v_2 = v_6 - v_4 = v_8 - v_6 = \text{etc.} \tag{8c}$$

Substituting eqs. (8c) or (8b) in eq. (8a) one obtains:

$$\tan(x_k w) = Bx_k \text{ or } \tan(x_k w) = D(x_k w) \tag{8d}$$

where $D$ is real arbitrary constant positive or negative. Eq. (8d) is the transcendental trigonometric equation for determining the positions $x_k$ of the elements in the NOSA-SSLP array for the case of equal value sidelobes levels when the distance between the sidelobes of equal distribution $w$ is prescribed and the arbitrary constant $D$ is given for each case. In the above case of eq. (8d) all the lower explicitly specified sidelobes are of equal value $F(v_1) = F(v_3) = F(v_5) = F(v_7) =$ etc. and all the upper explicitly specified sidelobes are of equal value $F(v_2) = F(v_4) = F(v_6) = F(v_8) =$ etc. By choosing $F_o$ in the NOSA-SSLP array of this invention such that $F(v_1) = -F(v_2)$ one will obtain the NOSA-SSLP array with the radiation power pattern $F^2(u)$ with all the explicitly given sidelobes of equal magnitude $F^2(v_1) = F^2(v_2) = F^2(v_3) = F^2(v_4) =$ etc. This can be done in the above NOSA-SSLP array of this invention for the case of odd ($F_o \neq 0$) number of elements, when one has the center element $A_o = 2F_o$ in eq. (3b). By requiring in eq. (3b):

$$F(v_1) = -F(v_2) \text{ or } F(v_1) + F(v_2) = 0 \tag{8e}$$

one may find $F_o$ in eq.(3b) in the form of a determinant like in eq.(3a), where the first row has been replaced by the terms $$\left| -\frac{1}{2x_1}(\cos x_1 v_1 + \cos x_1 v_2), -\frac{1}{2x_2}(\cos x_2 v_1 + \cos x_2 v_2), \text{etc.} \right|$$

Substituting the determinantal form of $F_o$ as found above in eq.(3b) one will find the value of the radiation pattern for this case in a determinantal form as in eq. (3a) provided that the first row will be replaced by the following terms:

$$\frac{\cos(x_1 u) - (\frac{1}{2})\cos(x_1 v_1) - (\frac{1}{2})\cos(x_1 v_2)}{x_1} \tag{8f}$$

$$\frac{\cos(x_N u) - (\frac{1}{2})\cos(x_N v_1) - (\frac{1}{2})\cos(x_N v_2)}{x_N}$$

By substituting eq.(8f) instead of the first row of eq.(3a), one obtains the radiation pattern $F(u)$ for the present case of the NOSA-SSLP array. It can be easily shown that in this case $F(v_1) = -F(v_2)$.

In the second example the sidelobe level value $F(v_i)$ will be specified in relation to the level value of the main beam $F(0)$ for any explicitly specified sidelobe at the position $u=v_i$ of the radiation pattern $F(u)$, for symmetric NOSA-SSLP array of the present invention, for the case of even ($F_o=0$) number of elements, as given in eq. (3a). The same example will also apply to odd ($F_o\neq 0$) number of elements, as given in eq. (3b), provided that only the resultant radiation pattern $F(u)-F_o$ will be discussed. Let us assumed that the sidelobe level value $F(v_i)$ is specified in relation in the level value of the main beam $F(0)$ in the following form:

$$\frac{F(O)}{F(v_i)} = \frac{1}{S_1} \text{ or } F(v_i) - S_i F(O) = 0 \qquad (9a)$$

where $S_i$ is an arbitrary real constant positive or negative. For the regular case, where the main beam $F(0)$ is larger than the sidelobe level values, one will have $-1 < S_i < +1$, where $S_i$ might be positive and negative in alternate order for $u=v_i$. Substituting eq.(3a) for symmetric NOSA-SSLP array with even number of elements ($F_o=0$) in the right hand side equation of (9a) and combining the two determinants along the first row, one will obtain the resulting determinant to be zero. Each term in the first row of the resulting determinant will be the difference between the two corresponding terms of the two original determinants. From the general theory of determinants it is well known that the resulting determinant derived above will be zero if one has for every column $k = 1,2,3 \ldots N$ the following identity:

$$\frac{\cos(x_k v_i) - S_i}{x_k} = \sum_{n=1}^{N-1} G_n^i \sin(x_k v_n) \qquad (9b)$$

where $G_n^i$ are arbitrary real constants positive or negative. Eq.(9b) applies to all the explicitly specified sidelobe positions, where the sidelobe levels have been also specified, namely, for $i=1,2,3 \ldots (N-1)$. Equation (9b) gives us a set of transcendental trigonometric equations for specified sidelobe values levels with respect to the main beam for the explicitly specified sidelobe positions for the NOSA-SSLP array of even symmetric array of even number of elements ($F_o=0$) which could be solved by non-linear computer techniques.

In the third example the problem of finding the positions of an additional number of implicit sidelobes at $u=v_q$ where $q = N, N+1, N+2$, etc. in the radiation pattern $F(u)$ for the symmetric NOSA-SSLP array of the present invention will be considered. It has been shown in eq.(3) that one can specify explicitly (N-1) sidelobe positions for the symmetric NOSA-SSLP array of 2N or of (2N+1) elements. Additional number of implicitly specified sidelobe positions at $u=v_q$ could be found by solving the determinantal equation:

$$F(v_q) = 0 \text{ for } q = N, N+1, N+2, N+3, \text{ etc.} \qquad (10a)$$

under the assumption that $F'(v_q)\neq 0$. The derivative $F'(u)$ of the determinantal expression in eq.(3a) is found by replacing the first row of eq.(3a) by the following terms:

$$|-\sin(x_1 u), -\sin(x_2 u), -\sin(x_3 u), \ldots -\sin(x_N u)|$$
1st row $\qquad$ (10b)

which should be substituted in eq.(10a) with the minus signs being cancelled. By solving the determinantal eq. (10a) one will obtain the additional implicit sidelobe positions of the NOSA-SSLP symmetric array. According to the general theory of determinants, one possible form of accomplishing the zero determinantal equation of eq. (10a) will be if each and every term of the first row in eq. (10b) will be the linear sum of all the other corresponding terms in the determinant in eq. (3a), namely, for each and every $k=1,2,3,\ldots N$ one will have:

$$\sin(x_k v_q) = \sum_{m=1}^{N-1} H_m^q \sin(x_k v_m) \qquad (10c)$$

where $H_m^q$ are arbitrary real constants positive or negative. Equation (10c) gives us a set of transcendental trigonometric equations for the specified implicit sidelobe positions for the NOSA-SSLP symmetric array with even or odd number of elements. While eq.(10c) gives N linear equations for (N-1) unknown constants $H_m^q$ one should realize that the positions of the elements $x_k$ and the explicit positions of the explicitly specified sidelobes $v_m$ could also be changed and adjusted to accomplish eq. (10c), which could be solved by non-linear computer techniques.

By using the determinantal expressions of the present invention one is able to design the NOSA-SSLP symmetric array which will be superior in performance as compared to the classical uniformly spaced arrays, or eliminate the grating lobes which appear in the uniformly spaced arrays. Furthermore, the general mathematical theorems which apply to determinants and matrices could be used in order to develop the design and the theory of the present invention of the NOSA-SSLP array and thus develop this invention further. Thus, while the design of the particular case of the uniformly spaced array in accordance with the invention by S. A. Schelkunoff in 1943 is based on the study of polynomials and their roots, the design of the general nonuniformly spaced array in accordance with the present invention by H. Unz is based on the study of determinants and matrices and their roots, and the case of the uniformly spaced array becomes just a vary particular case of the present invention.

Since the Nonuniformly Optimally Spaced Array with Specified Sidelobes Positions in the radiation pattern (the NOSA-SSLP array) described in the foregoing specifications could be used as the basis for building more sophisticated arrays with specific or minimax performance indices requirements, this invention covers, but is not limited to, arrays with specific requirements on the radiation pattern, sidelobe level, beamwidth, impedance, bandwidth, mutual coupling, gain, directivity, polarization, noise temperature, signal to noise ratio, interference ratio, and any other specific indices, if the array includes in whole or in part certain definitive aspects of this invention as a part of its analysis or synthesis. This invention also covers this array, when the elements used in the array are of different types, including but not limited to, dipoles, slots, horns, apertures, parabolic reflectors, dishes, and many others. This invention also covers this array when it is used for all different purposes. Many of the design techniques in prior art developed for electromagnetic arrays can be and have been applied with modifications to acoustic arrays, seismic arrays and arrays in other fields. Thus, this invention described in the foregoing specifications covers, but is not limited to, all such arrays or combinations of them in other fields for any purpose. This invention is suitable for acoustic (sonar) arrays and seismic arrays where the number of array elements per wavelength requirements is relatively large. Thus this invention covers the NOSA-SSLP acoustic arrays and sonar arrays, used with acoustic elements of any type, when used under water or above water, for whatever purpose. This invention covers the NOSA-SSLP seismic arrays, used with seismic elements, geophones, seismometers, seismographs or other elements, when used underground or above ground for whatever purpose. Thus, the foregoing invention of the NOSA-SSLP array covers any array of any shape and size, and used with any kind of elements for any purpose, provided that the invention described here will be used there in whole or in part, or will be used there as a part of its analysis or synthesis during the design procedure.

While in the foregoing specification, I have set forth certain details of the Nonuniformly Optimally Spaced Array with Specified Sidelobe Positions in the radiation pattern (the NOSA-SSLP array) and its semi-rigorous synthesis technique, for the purpose of illustrating one mode of the invention, it will be understood that such details may be varied widely by those skilled in the art without departing from the spirit of my invention, and it is therefore aimed to cover all such changes and modifications in all areas of endeavor where arrays are used, as fall within the true spirit and scope of this invention.

What I claim is:

1. A method of synthesis for controlling the radiation pattern of a linear symmetric nonuniformly spaced array with nonuniform amplitudes by specifying explicitly the sidelobe positions (directions) in the array radiation pattern, said method based on the following rigorous relationship which expresses the array radiation pattern $F(u)$ of a symmetric nonuniformly spaced array of (2N) or (2N+1) elements by a constant plus a determinant of N rows and N columns, with the first row of the determinant consisting of N terms $(1/x_p)\cos(x_p u)$, and each subsequent row consisting of N terms $\sin(x_p v_s)$, with $v_s$ being identical in all the terms of each row and represents explicitly the position (direction) of the corresponding sidelobe so specified in the array radiation pattern $F(u)$, the total number of sidelobe positions (directions) so explicitly specified is equal to (N−1), where one has a total of 2(N−1) sidelobe positions (directions) explicitly specified in the symmetric radiation pattern $F(u)$ of the symmetric nonuniformly spaced array of (2N) or (2N+1) elements, where $u = \pi \sin \theta$, with $\theta$ being the angle with the normal to the array axis, $x_p$ is the distance of the p-th array element in terms of half wavelength ($\lambda/2$) from the center of the symmetric array, with only the elements of one side of the symmetric array to be used as terms in the above mentioned determinant, $A_p$ is the amplitude of each element of the symmetric array to be found by developing the above mentioned determinant along its first row and identifying the amplitude of each element at position $x_p$ as the factor multiplying the corresponding term $\cos(x_p u)$.

2. A method of synthesis as in claim 1, where an additional number of implicitly specified sidelobe positions (directions) in the radiation pattern $F(u)$ at $u = v_q$ will be taken into account by solving the determinantal equation $F'(v_q) = 0$, where $F(u)$ is given by the determinantal expression in claim 1.

3. A method of synthesis as in claim 1, said method based on relating the value of one sidelobe level $F(v_i)$ to one or more other sidelobe levels $F(v_j)$, and giving the relationships in the form of determinantal expressions as in claim 1, the resulting determinantal equations to be solved directly or through the application of related transcendental trigonometric equations or sets of equations.

4. A method of synthesis as in claim 1, said method based on specifying the value of each sidelobe level $F(v_i)$ in relation to the value of the main beam level $F(0)$, and giving the relationships in the form of determinantal expressions as in claim 1, the resulting determinantal equations to be solved directly or through the application of related transcendental trigonometric sets of equations.

5. A method of synthesis as in claim 1, with the exception that the last row of the determinant, or any number of additional rows at the bottom of the determinant, will be replaced by arbitrary real constants, to be determined by other kind of additional requirements on the radiation pattern $F(u)$.

6. A method of synthesis for controlling the sidelobe level and/or the beamwidth of the directive radiation pattern $F(u)$ of a symmetric nonuniformly spaced array with nonuniform amplitudes, said method based on specifying the set of the sidelobe positions (directions) of the array radiation pattern $F(u)$ as in claim 1, where the first sidelobe position (direction) near the main beam will also control the beamwidth of the main beam.

7. An arrangement of a set of elements in a nonuniformly optimally spaced array with nonuniform amplitudes, as specified in claim 1, in which each element is an electromagnetic antenna, radiator or receiver, like dipole, slot, horn, aperture, dish, parabolic reflector, etc. or a combination of them.

8. An arrangement of a set of elements in a nonuniformly optimally spaced array with nonuniform amplitudes, as specified in claim 1, in which each element is an acoustic or sonar radiator or receiver, or a combination of them, used under water or above water.

9. An arrangement of a set of elements in a nonuniformly optimally spaced array with nonuniform amplitudes, as specified in claim 1, in which each element is a seismic radiator or receiver, like geophone, seismometer, seismograph, etc. or a combination of them, used under ground or above ground.

10. An array comprising a grouping of sub-arrays, each designed in accordance with the method set out in claim 1.

* * * * *